(12) United States Patent
Roth

(10) Patent No.: US 6,266,469 B1
(45) Date of Patent: Jul. 24, 2001

(54) FIBER OPTIC CABLE PULLING DEVICE

(75) Inventor: Richard F. Roth, Downers Grove, IL (US)

(73) Assignee: Molex Incorporated, Lisle, IL (US)

( * ) Notice: Subject to any disclaimer, the term of this patent is extended or adjusted under 35 U.S.C. 154(b) by 0 days.

(21) Appl. No.: 09/217,485

(22) Filed: Dec. 21, 1998

(51) Int. Cl.[7] .................................................. G02B 6/36
(52) U.S. Cl. ............................................. 385/136; 385/137
(58) Field of Search ..................................... 385/136, 137

(56) References Cited

U.S. PATENT DOCUMENTS

| 4,684,211 | 8/1987 | Weber et al. ........................ 350/96.2 |
| 5,039,196 | * 8/1991 | Nilsson ................................. 385/136 |
| 5,807,026 | * 9/1998 | Valette ................................. 405/158 |
| 5,863,083 | * 1/1999 | Giebel et al. ........................ 294/1.1 |

* cited by examiner

Primary Examiner—Frank G. Font
Assistant Examiner—Michael P. Mooney
(74) Attorney, Agent, or Firm—A. A. Tirva

(57) ABSTRACT

A fiber optic cable pulling device includes a base having a cavity for receiving a connector terminated to a fiber optic cable. A cover is assembled to the base for closing the cavity and capturing the connector therewithin, with the cable extending outwardly from the base. Complementary interengaging clamp portions are provided on the base and the cover for clamping onto at least one of the cable and connector when the cable is assembled to the base.

21 Claims, 2 Drawing Sheets

FIBER OPTIC CABLE PULLING DEVICE

FIELD OF THE INVENTION

This invention generally relates to the art of fiber optics and, particularly, to a fiber optic cable pulling device.

BACKGROUND OF THE INVENTION

In fiber optic transmission systems, signals are transmitted along optical fibers by optical frequency waves (light) generated from a source thereof. Optical fibers typically are fabricated of glass materials and are very delicate or fragile. An optical fiber may be on the order of 125 microns in diameter.

Fiber optic connectors are employed to terminate optical fiber cables and to facilitate connection of the cables to other cables or other optical fiber transmission devices. A typical optical fiber connector includes a ferrule which mounts and centers the optical fiber within the connector. The ferrule may be mounted in some form of ferrule holder which is assembled within another body member of the connector. The ferrule may be fabricated of such material as ceramic, and the ferrule holder may be molded from plastic material.

In some fiber optic transmission systems, connectors of the general character described above, terminated to respective fiber optic cables, must be installed through ducts, conduits or the like. It is preferred to pull a connector and its terminated cable through the duct work. This must be done in a manner to protect the delicate connector and terminated cable while maintaining the connector and cable clean and free of any dust, dirt or other debris which often accumulates in the ducts or conduits. The present invention is directed to providing a very simple yet extremely efficient and reusable device for pulling a fiber optic cable through duct work or the like.

SUMMARY OF THE INVENTION

An object, therefore, of the invention is to provide a new and improved fiber optic cable pulling device.

In the exemplary embodiment of the invention, the device includes a base having a cavity for receiving a connector terminated to the fiber optic cable. A cover is provided for assembly to the base to close the cavity and capture the connector therewithin, with the cable extending outwardly from the base. Complementary interengaging clamp means are provided between the base and the cover for clamping onto at least one of the cable and connector when the cover is assembled to the base.

As disclosed herein, the clamp means includes a channel in the base through which the cable extends outwardly of the base. A clamping boss is provided on the cover for projecting into the channel in clamping engagement with the cable therewithin. The clamping boss may have a serrated surface for positively gripping the cable. A novel feature of the invention is to provide a deformable ring about the fiber optic cable for clamping purposes. The ring may be positioned in the channel in the base. In the preferred embodiment, the deformable ring is fabricated of a heat shrinkable rubber material which is shrunk around the cable, and the rubber ring is deformed tightly about the cable within the channel in the base but not so tight as to damage the fiber.

The base and cover of the device are elongated, with the clamp means at one end thereof, and including grasping means at the other end thereof. In the preferred embodiment, the grasping means is provided by a pulling cord in the form of a loop extending through a hole in the base. A crimp ring is crimped onto free ends of the pulling cord to form the loop thereof. The crimp ring is larger than the through hole and is captured within the base to prevent the loop from pulling out of the base.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
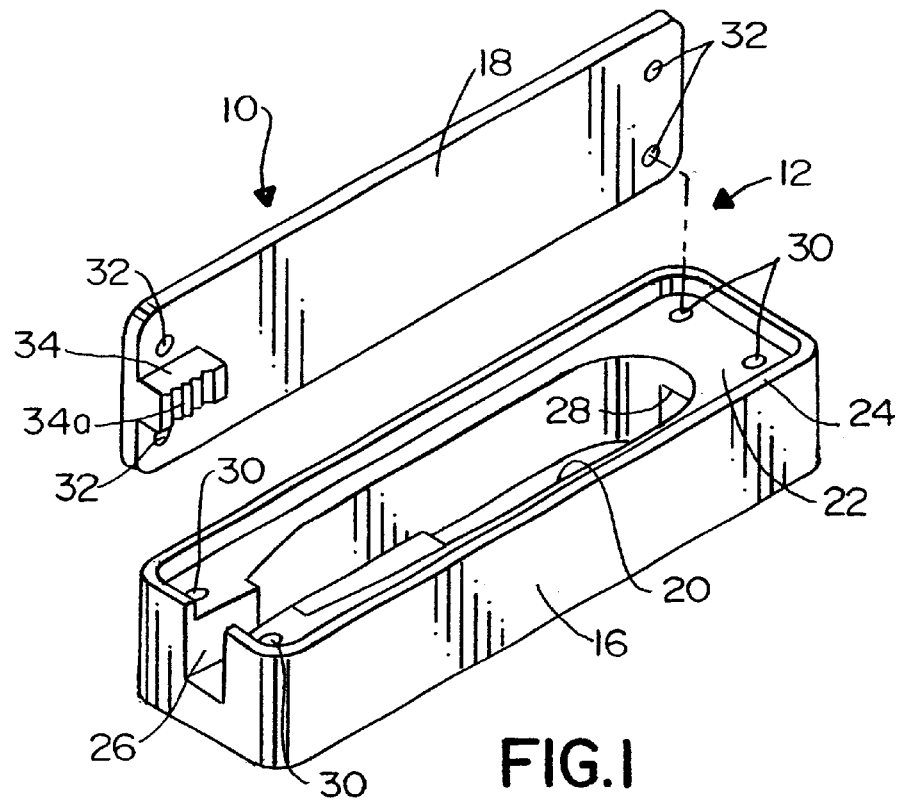
FIG. 1 is a perspective view of the fiber optic cable pulling device, with the cover removed from the base and the pulling cord not shown.

Referring to the drawings in greater detail, and first to FIG. 1, the invention is embodied in a fiber optic cable pulling device, generally designated 10, which includes a two-part housing, generally designated 12, along with a pulling cord 14 (FIGS. 4 and 5) which is not shown in FIG. 1. Two-part housing 12 includes a base part 16 and a cover part 18.

More particularly, base 16 of the two-part housing of pulling device 10 is a one-piece structure which can be unitarily molded of plastic or other appropriate material. The base has an internal cavity 20 substantially surrounded by a ledge 22 recessed inwardly of a peripheral top edge 24 of the base. A cable-receiving channel 26 is formed in the base communicating with cavity 20. As can be seen, the base is elongated, with channel 26 being at one end thereof, and a through hole 28 is formed through the base at the opposite end thereof. The through hole also communicates with cavity 20. Finally, an internally threaded mounting hole 30 is provided at each of the four corners of ledge 22. Instead of a threaded hole, a thread forming screw may also be used.

Cover 18 of the two-part housing of pulling device 10 is in the form of an elongated, generally rectangular plate which seats on top of ledge 22 within peripheral top edge 24 of base 16. The cover is a one-piece structure which also can be fabricated of plastic or other appropriate material. The base includes four mounting holes 32 which are through holes and which are alignable with internally threaded mounting holes 30 in base 16. The cover includes an integrally molded clamping boss 34 which is sized and shaped for insertion into cable-receiving channel 26 of the base. Preferably, the clamping boss has a serrated surface 34a for positively gripping a fiber optic cable inserted into channel 26 in the base, as will be described hereinafter.

Basically, clamping boss 34 on the underside of cover 18 and channel 26 in base 16 form a complementary interengaging clamp means for the fiber optic cable.

Figure 2:
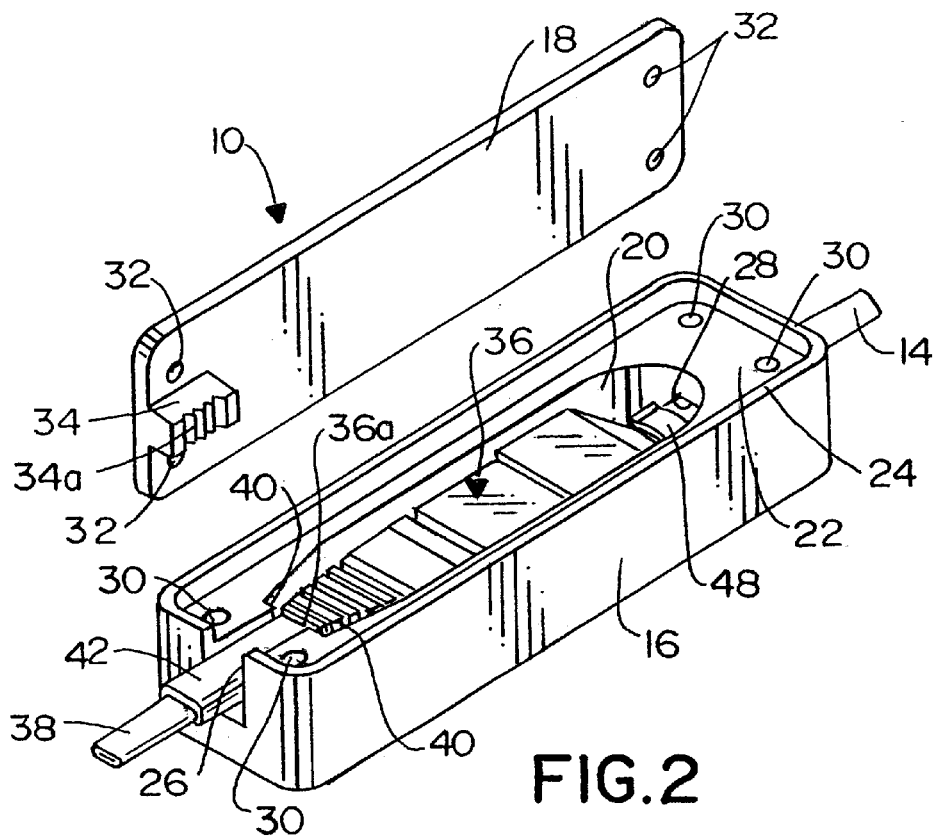
FIG. 2 is a view similar to that of FIG. 1, with a fiber optic connector and terminated cable positioned in the base.

FIG. 2 shows an optical fiber connector, generally designated 36, positioned within cavity 20 in base 16 of the two-part housing of pulling device 10. As described in the "Background", above, the connector is terminated to one or more optical fibers of a fiber optic cable 38. While the connector is positioned within cavity 20, cable 38 extends outwardly of base 16 through channel 26. The width of the channel preferably is narrower than the width of a rear end 36a of the connector so that the connector abuts against shoulders 40 on opposite sides of channel 26 within cavity 20.

According to another aspect of the invention, a deformable ring 42 (FIG. 2) is positioned about fiber optic cable 38 at a location in registry within channel 26. Therefore, when cover 18 is assembled to base 16, clamping boss 34 and its serrated edge 34a engage and deform ring 42. Very little deformation is necessary and needed to prevent fiber damage. The invention contemplates that deformable ring 42 can be fabricated of a heat shrinkable rubber material so that the ring is shrunk tightly about the cable. Then, when clamping boss 34 is clamped against the ring within channel 26, the rubber material of the ring deforms and completely fills the channel to provide a tight strain relief means onto the cable. To further facilitate this strain relief system, adhesive may be employed between the ring and the cable for further bonding therebetween.

Figure 3:
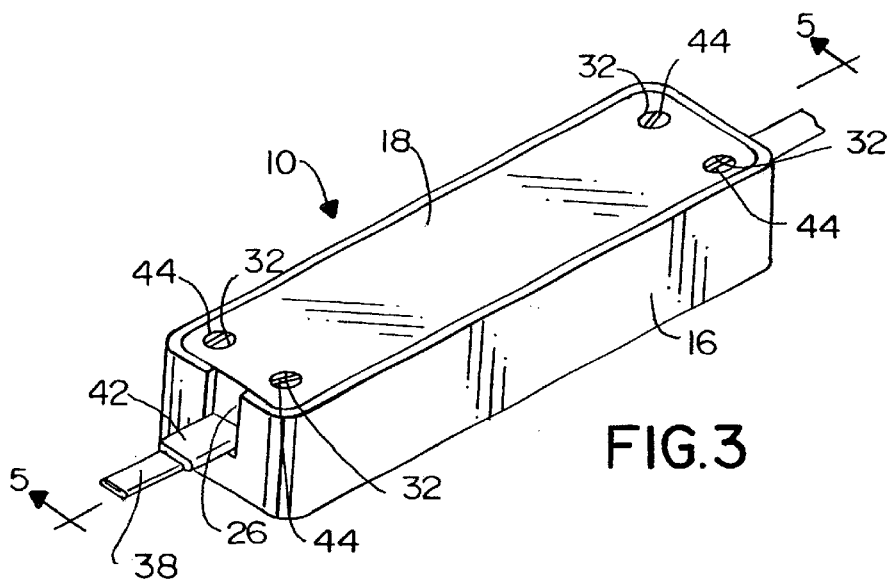
FIG. 3 is a view similar to that of FIG. 2, with the cover closed onto the base.

FIG. 3 shows cover 18 assembled to base 16 with the connector positioned therewithin (as seen in FIG. 2), and with fiber optic cable 38 projecting from the assembled device through channel 26 in the base. The cover is fixed to the base by fastening means in the form of four screws 44 which extend freely through mounting holes 32 in the cover and threaded into internally threaded mounting holes 30 (FIGS. 1 and 2) of the base. The screws allow for the cover to be removed from the base so that pulling device 10 can be reusable for a subsequent connector and cable once a given connector and cable have been properly pulled through an appropriate duct, conduit or the like.

Figure 4:
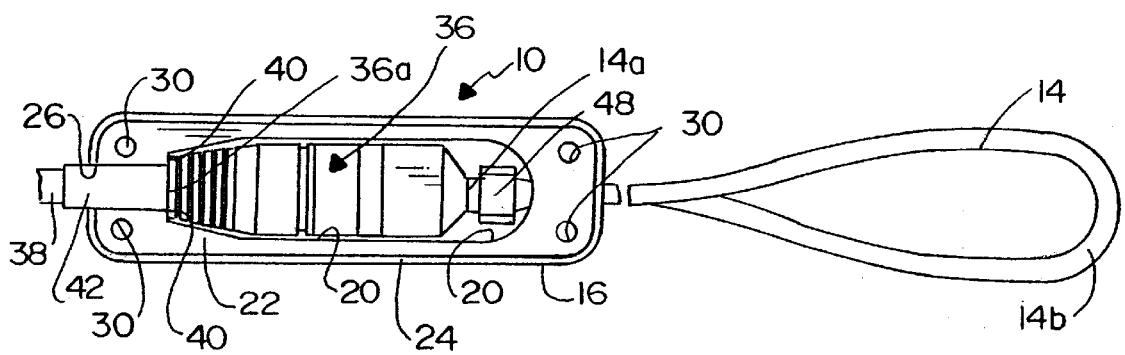
FIG. 4 is a top plan view of the base having the connector assembled therein, with the cover removed and showing the pulling cord assembled to the base.
Figure 5:
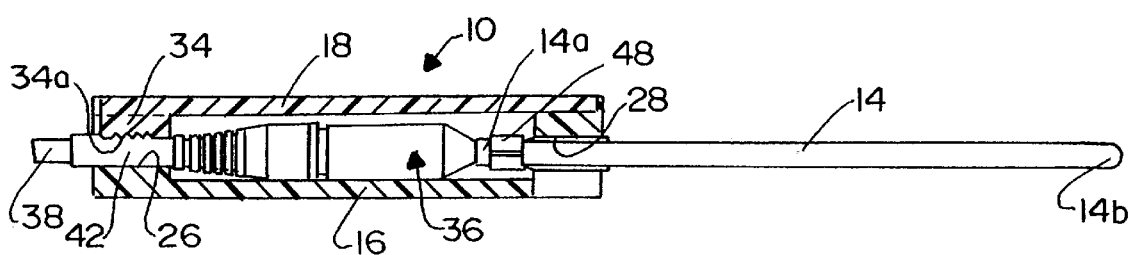
FIG. 5 is a vertical section taken generally along line 5—5 of FIG. 3.

Referring to FIGS. 4 and 5 in conjunction with FIGS. 2 and 3, pulling cord 14 provides a grasping means for elongated pulling device 10 at an end thereof opposite the end from which cable 38 projects. In particular, it can be seen best in FIG. 4 that the pulling cord is in the form of a loop having free ends 14a located within cavity 20 in base 16. The free ends of the loop are clamped and fixed together by a crimp ring 48. The crimp ring is wider than through hole 28 in base 16 so that the crimp ring is captured within the base. For instance, the crimp ring may be of deformable metal material. In essence, the crimp ring forms an enlargement means of the looped pulling cord, captured within the base to prevent the pulling cord from pulling out of the base.

In assembly, the closed end 14b of the looped pulling cord 14 can be inserted inside/out in the direction of arrow "A" (FIG. 5) through hole 28 at the front end of base 16. After crimp ring 48 abuts against the base at the front end of cavity 20, the looped pulling cord can be straightened out in the direction of arrow "B" for proper use. Therefore, the pulling cord is made of a flexible material such as a nylon mesh rope either in stranded or hollow form. With the looped pulling cord being so readily assembled to base 16, a separate inventory of the pulling cords can be maintained, independent of the base or cover of the pulling device, should the cord become broken or damaged for any reason.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. A fiber optic cable pulling device, comprising:
   a base including a cavity for receiving a connector terminated to a fiber optic cable;
   a cover for assembly to the base for closing the cavity and capturing the connector therewithin, with the cable extending outwardly from the base; and
   complementary interengaging clamp means between the base and the cover for clamping onto at least one of the cable and connector when the cover is assembled to the base.

2. The fiber optic cable pulling device of claim 1 wherein said complementary interengaging clamp means include a channel in the base communicating with the cavity and through which the cable extends outwardly of the base, and a clamping boss on the cover for projecting into the channel in clamping engagement with the cable therewithin.

3. The fiber optic cable pulling device of claim 2 wherein said clamping boss has a serrated surface for positively gripping the cable.

4. The fiber optic cable pulling device of claim 1, including a deformable ring about the fiber optic cable in position for engagement by said complementary interengaging clamp means.

5. The fiber optic cable pulling device of claim 4 wherein said deformable ring is fabricated of a heat shrinkable rubber material.

6. The fiber optic cable pulling device of claim 5 wherein one of said base and cover includes a channel which captures the deformable ring, and the other of said base and cover includes a clamping boss for projecting into the channel and deforming said ring tightly about the cable.

7. The fiber optic cable pulling device of claim 1 wherein said base and cover are elongated with said clamp means at one end thereof and including grasping means at the other end thereof.

8. The fiber optic cable pulling device of claim 7 wherein said grasping means comprise a pulling cord fixed to the base.

9. The fiber optic cable pulling device of claim 8 wherein said pulling cord is in the form of a loop extending through a through hole in the base, with enlargement means on the loop captured within the base to prevent the loop from pulling out of the base.

10. The fiber optic cable pulling device of claim 9 wherein said enlargement means comprises a crimp ring crimped onto free ends of the pulling cord to form the loop thereof.

11. The fiber optic cable pulling device of claim 1, including fastening means removably mounting the cover on the base whereby the device is reusable.

12. A fiber optic cable pulling device, comprising:
   a two-part housing including a base part and a cover part, the base part having a cavity for receiving a connector terminated to a fiber optic cable,
   a cover part for assembly to the base part to close the cavity and capture the connector therewithin and with the cable extending outwardly from the base part; and
   a pulling cord independent of and removably fixed to the base part at an end thereof opposite from the outwardly extending cable.

13. The fiber optic cable pulling device of claim 12 wherein said pulling cord is in the form of a loop extending through a through hole in the base part, with enlargement means on the loop captured within the base part to prevent the loop from pulling out of the base part.

14. The fiber optic cable pulling device of claim 13 wherein said enlargement means comprises a crimp ring crimped onto free ends of the pulling cord to form the loop thereof.

15. A fiber optic cable pulling device, comprising:
- an elongated base including a cavity for receiving a connector terminated to a fiber optic cable, and a channel in the base through which the cable extends outwardly therefrom;
- an elongated cover for assembly to the base for closing the cavity and capturing the connector therewithin, with the cable extending outwardly through the channel in the base, the cover including a clamping boss for projecting into the channel in clamping engagement with the cable therewithin;
- a deformable ring about the fiber optic cable in position for engagement by the clamping boss of the cover within the channel of the base; and
- a pulling cord in the form of a loop extending through a through hole in the base, with enlargement means of the loop captured within the base to prevent the loop from pulling out of the base.

16. The fiber optic cable pulling device of claim 15 wherein said clamping boss has a serrated surface for positively gripping the cable.

17. The fiber optic cable pulling device of claim 15 wherein said deformable ring is fabricated of a heat shrinkable rubber material.

18. The fiber optic cable pulling device of claim 15 wherein said enlargement means comprises a crimp ring crimped onto free ends of the pulling cord to form the loop thereof.

19. The fiber optic cable pulling device of claim 15, including fastening means removably mounting the cover on the base whereby the device is reusable.

20. A fiber optic cable pulling device, comprising:
- a two-part housing for receiving a connector terminated to a fiber optic cable and capturing the connector therewithin, with the cable extending outwardly from the housing;
- complementary interengaging clamp means between the two parts of the housing for clamping onto the cable; and
- a deformable ring about the fiber optic cable in position for engagement by said clamp means.

21. The fiber optic cable pulling device of claim 20 wherein said deformable ring is fabricated of a heat shrinkable rubber material.

* * * * *